United States Patent
Hoelzel et al.

(10) Patent No.: US 8,864,215 B2
(45) Date of Patent: Oct. 21, 2014

(54) AIR GUIDING DEVICE FOR A MOTOR VEHICLE

(75) Inventors: Steffen Hoelzel, Eberdingen (DE); Bjoern Foerster, Wurmberg (DE); Gerard Nijman, Losser (NL); Mike Ludovica Karel Peeters, Vlimmeren (BE)

(73) Assignees: Dr. Ing. H. C. F. Porsche Aktiengesellschaft, Stuttgart (DE); Apollo Vredestein B.V., Enschede (NL)

( * ) Notice: Subject to any disclaimer, the term of this patent is extended or adjusted under 35 U.S.C. 154(b) by 0 days.

(21) Appl. No.: 13/606,258

(22) Filed: Sep. 7, 2012

(65) Prior Publication Data

US 2013/0057022 A1 Mar. 7, 2013

(30) Foreign Application Priority Data

Sep. 7, 2011 (DE) .......................... 10 2011 112 514

(51) Int. Cl.
*B62D 35/02* (2006.01)
*B62D 35/00* (2006.01)

(52) U.S. Cl.
CPC ..................................... *B62D 35/005* (2013.01)
USPC ...................................................... 296/180.5

(58) Field of Classification Search
USPC .......... 296/180.5, 180.1, 180.3, 180.2, 180.4, 296/192
See application file for complete search history.

(56) References Cited

U.S. PATENT DOCUMENTS

| 6,170,904 B1 * | 1/2001 | Schaedlich et al. ........ 296/180.1 |
| 7,040,690 B2 | 5/2006 | Soja et al. |
| 7,891,727 B2 * | 2/2011 | Rogner et al. ................ 296/192 |
| 2011/0150598 A1 * | 6/2011 | Mitsuo et al. .................. 411/48 |

FOREIGN PATENT DOCUMENTS

| DE | 101 60 748 | 6/2003 |
| DE | 10 2009 033 695 | 1/2011 |
| EP | 1 935 764 | 6/2008 |

OTHER PUBLICATIONS

German Search Report of Jul. 16, 2012.

* cited by examiner

*Primary Examiner* — Joseph D Pape
*Assistant Examiner* — Dana Ivey
(74) *Attorney, Agent, or Firm* — Gerald E. Hespos; Michael J. Porco; Matthew T. Hespos

(57) ABSTRACT

An air guiding device for a motor vehicle has a spoiler lip (12) extending in the transverse direction of the vehicle and an actuating device (28) for moving the spoiler lip (12) between a retracted rest position and an extended maximum position. The spoiler lip (12) is mounted on an adaptor (34) and the adaptor (34) is connected to a fastening device (38). The air guiding device is connectable via the adaptor (34) and the fastening device (38) to a front panel (40) of the motor vehicle.

8 Claims, 4 Drawing Sheets

AIR GUIDING DEVICE FOR A MOTOR VEHICLE

CROSS REFERENCE TO RELATED APPLICATION

This application claims priority under 35 USC 119 to German Patent Appl. No. 10 2011 112 514.4 filed on Sep. 7, 2011, the entire disclosure of which is incorporated herein by reference.

BACKGROUND OF THE INVENTION

1. Field of the Invention

The invention relates to an air guiding device for a motor vehicle.

2. Description of the Related Art

EP 1 935 764 B1 and from DE 101 60 748 B4 disclose an air guiding device with a spoiler lip that extends in the transverse direction of the vehicle at the front of the vehicle. An actuating device moves the spoiler lip between a retracted rest position and an extended maximum position and thereby results in an aerodynamic effect that is intended to optimize the output values of the motor vehicle. The actuating device is a flexible, inflatable tube that can be filled or emptied to transfer the spoiler lip into different positions between the retracted rest position and the extended maximum position. The elastomer of the pneumatic actuators is deformed elastically during the filling operation and builds up a restoring force that returns the spoiler lip toward the rest position during the emptying operation.

One end of the spoiler lip of the air guiding device of EP 1 935 764 B1 and DE 101 60 748 B4 is connected directly to a front panel of the motor vehicle. The spoiler lip of the air guiding device could be damaged and would have to be exchanged. However, changing the prior art spoiler lip is relatively complicated. Accordingly, it is the object of the present invention to provide a novel air guiding device for a motor vehicle.

SUMMARY OF THE INVENTION

The invention relates to a spoiler lip that is mounted on an adaptor that is connected to a fastening device. The air guiding device is connectable to a front panel of the motor vehicle via the adaptor and the fastening device.

The spoiler lip is not fastened directly to the front panel, but rather is fastened indirectly via an adaptor. For this purpose, the spoiler lip is mounted on the adaptor, the adaptor is connected to the fastening device, and both the adaptor and the fastening device are connectable to the front panel of the motor vehicle. Thus, the air guiding device can be connected securely to the front panel of the motor vehicle. However, the spoiler lip can be changed, for example as a result of damage, with a lesser degree of complexity.

A spoiler lip module that comprises the adaptor, the fastening device, the actuator and the spoiler lip can be preassembled and tested. The spoiler lip module then can be fit simply and rapidly to the front panel of the motor vehicle, for example as a replacement for a defective spoiler lip module.

The adaptor imparts an ideal rigidity to the spoiler lip module, and therefore to the air guiding device, for a force flux from the actuator via the adaptor to the spoiler lip. The fastening device imparts an ideal transverse rigidity to the spoiler lip module.

The adaptor and the spoiler lip preferably are connected via a first clip connection and the adaptor preferably is connectable to the front panel of the motor vehicle via a second clip connection. The adaptor and the fastening device preferably are connectable to the front panel of the motor vehicle via a screw connection. This indirect connection of the spoiler lip to the front panel of the motor vehicle using two clip connections and a screw connection is simple and reliable. The air guiding device can be preassembled simply and reliably in the form of a module and fastened in the form of a module to the front panel.

The adaptor and the spoiler lip preferably have magnets that help hold the spoiler lip on the adaptor in the retracted rest position. The spoiler lip can be held in a defined manner on the adaptor in the retracted rest position via the magnets.

Exemplary embodiments of the invention are explained in more detail, without being limited thereto, with reference to the drawing.

DETAILED DESCRIPTION OF THE PREFERRED EMBODIMENTS

Figure 1:
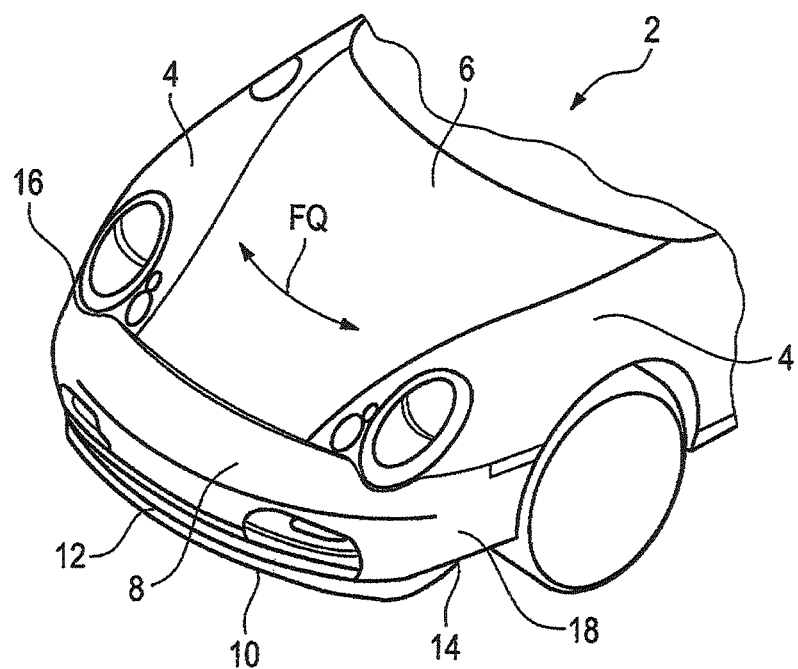
FIG. 1 is a perspective view of a front region of a motor vehicle with an air guiding device according to the invention.
Figure 2:
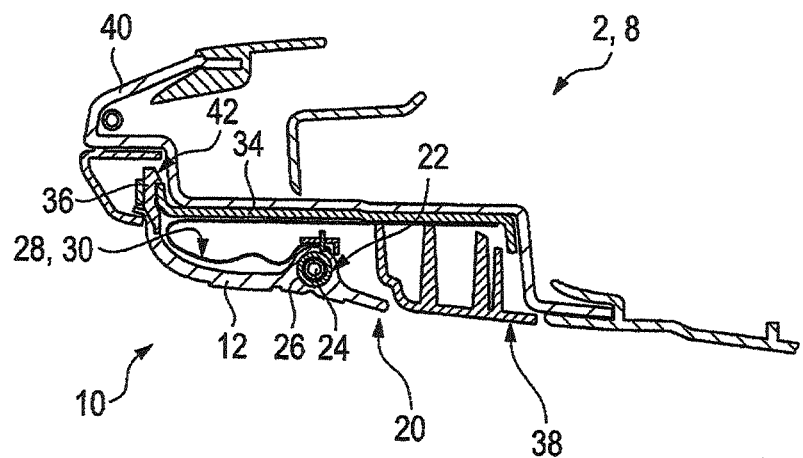
FIG. 2 is a first sectional view of the air guiding device of FIG. 1.
Figure 3:
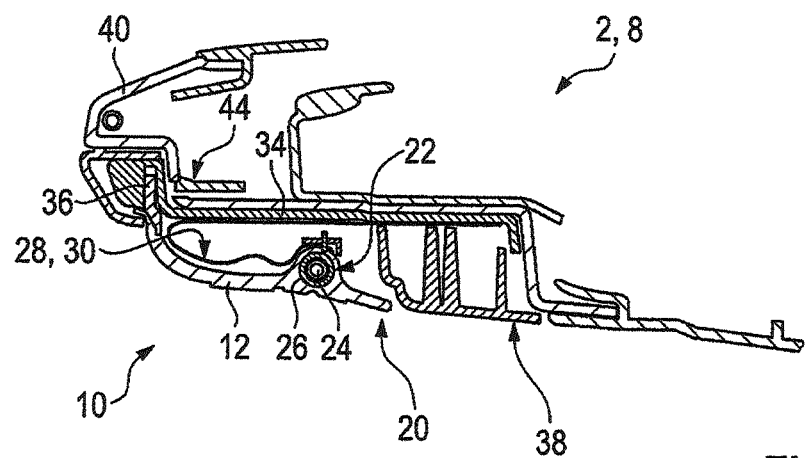
FIG. 3 is a second sectional view of the air guiding device of FIG. 1.

FIG. 1 shows a front section 2 of a motor vehicle. The front section 2 comprises lateral wings 4, an engine hood 6 or a trunk cover arranged between the lateral wings 4 and a front part 8 mounted in front of the engine hood 6 and the wings 4. The front part 8 forms the front end of the front portion 2 of the motor vehicle.

An air guiding device 10 according to the invention, of which only a spoiler lip 12 can be seen in the present view, is arranged below the front part 8. In the present view, the spoiler lip 12 is in a retracted rest position. The spoiler lip 12 extends substantially in the transverse direction FQ of the vehicle and ends with the free ends 14, 16 thereof or the lower side of lateral longitudinal sections 18 of the front part 8.

FIGS. 2 to 5 show different cross section through the front section 2 of the motor vehicle of FIG. 1 in the region of the air guiding device 10. The cross sections in FIGS. 2 to 4 run in the longitudinal direction of the motor vehicle and are offset parallel to one another, as seen in the transverse direction FQ of the vehicle.

The spoiler lip 12 of the air guiding device 10 preferably is manufactured from an elastomer and is subject to a change in length in the transverse direction FQ of the vehicle during a transfer from the illustrated rest position into an extended position.

A channel 22 is formed adjacent to a free end 20 of the spoiler lip 12 and extends in the transverse direction FQ of the vehicle. A flexurally elastic rod 24 is inserted into the channel 22 and is guided movably in a guide device 26. The guide device 26 may be a longitudinally elastic weatherstrip extending over the entire length of the spoiler lip.

The flexurally elastic rod 24 preferably is made from a PTFE, a GFRP-encased PTFE or from a different plastic, so that the rod 24 can be guided in the guide device 26 with minimal static and sliding friction.

Details of said flexurally elastic rod member 24 are known, for example, from DE 101 60 748 B4.

An actuating device 28, and preferably a pneumatic actuating device 28, is provided to move the spoiler lip 12 between the retracted rest position and an extended position.

The pneumatic actuating device 28 has at least one pneumatic actuator 30 that can be filled with or emptied of air. Air is supplied to or removed from each actuator 30 with the aid of air tubes 32 that are coupled to an air supply module (not shown).

The air guiding device 10 has an adaptor 34 and the spoiler lip 12 has a vulcanized-on end 36 opposite the free end 20 that can be mounted on the adaptor 34. The vulcanized-on end 36 of the spoiler lip 12 and the adaptor 34 are connected via a first clip connection 42.

The air guiding device 10 also has a fastening device 38. The adaptor 34 and the fastening device 38 initially are connected to each other, and the air guiding device 10 is connectable via the adaptor 34 and the fastening device 38 to a front panel 40 of the front part 8 of the motor vehicle.

The adaptor device 34 is connected to the fastening device 38 via a screw connection (not shown), namely with the actuating device 28 or the actuator 30 thereof is arranged partially between the adaptor 34 and the fastening device 38 in a rear section of the adaptor 34. According to FIG. 4, the adaptor 34 and fastening device 38 are aligned and centered relative to each other via intermeshing alignment means 52.

The adaptor 34 and the fastening device 38 are connected to the front panel 40 via a screw connection 46, with the adaptor 34 positioned between the front panel 40 and the fastening device 38 in the region of the screw connection 46. The screw connection 46 is assigned to the rear section of the adaptor device 34.

The adaptor 34 also is connected to the front panel 40 via a second clip connection 44. The second clip connection 44 between the adaptor 34 and the front panel 40, like the first clip connection 42 between the spoiler lip 12 and the adaptor 34, is assigned to a front section of the adaptor 34.

A spoiler lip module that comprises the adaptor 34, the fastening device 38, the actuating device 28 and the spoiler lip 12, can be preassembled and tested. The spoiler lip module can then simply and rapidly can be fit to the front panel 40 of the motor vehicle, for example as a replacement for a defective or damaged spoiler lip module.

The adaptor 34, which preferably is an adaptor plate, imparts an ideal rigidity to the spoiler lip module, and therefore to the air guiding device 10, for a force flux from the actuating device 28 via the adaptor device 34 toward the spoiler lip 12. The fastening device 38 imparts an ideal transverse rigidity to the spoiler lip module.

Figure 4:
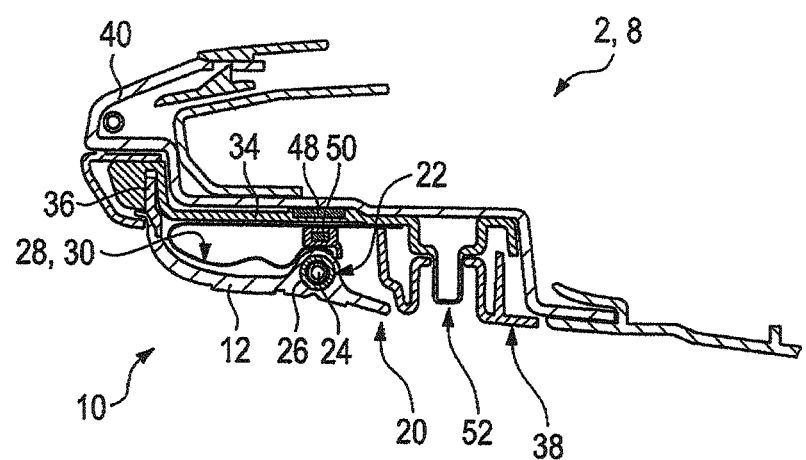
FIG. 4 is a third sectional view of the air guiding device of FIG. 1.
Figure 5:
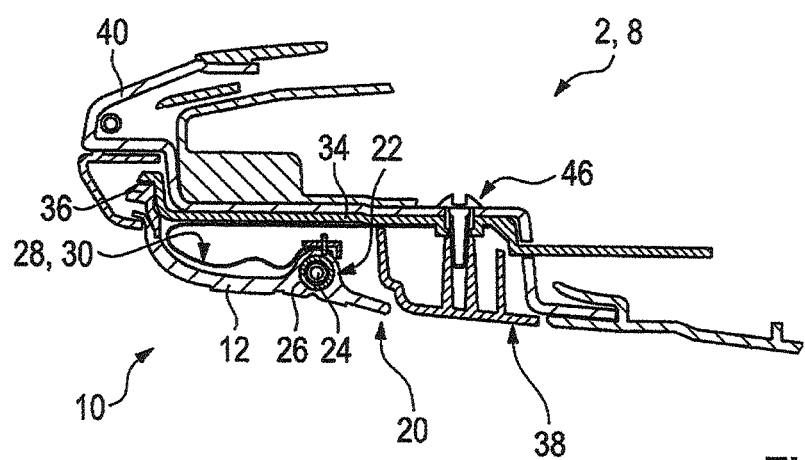
FIG. 5 is a fourth sectional view of the air guiding device of FIG. 1.
Figure 6:
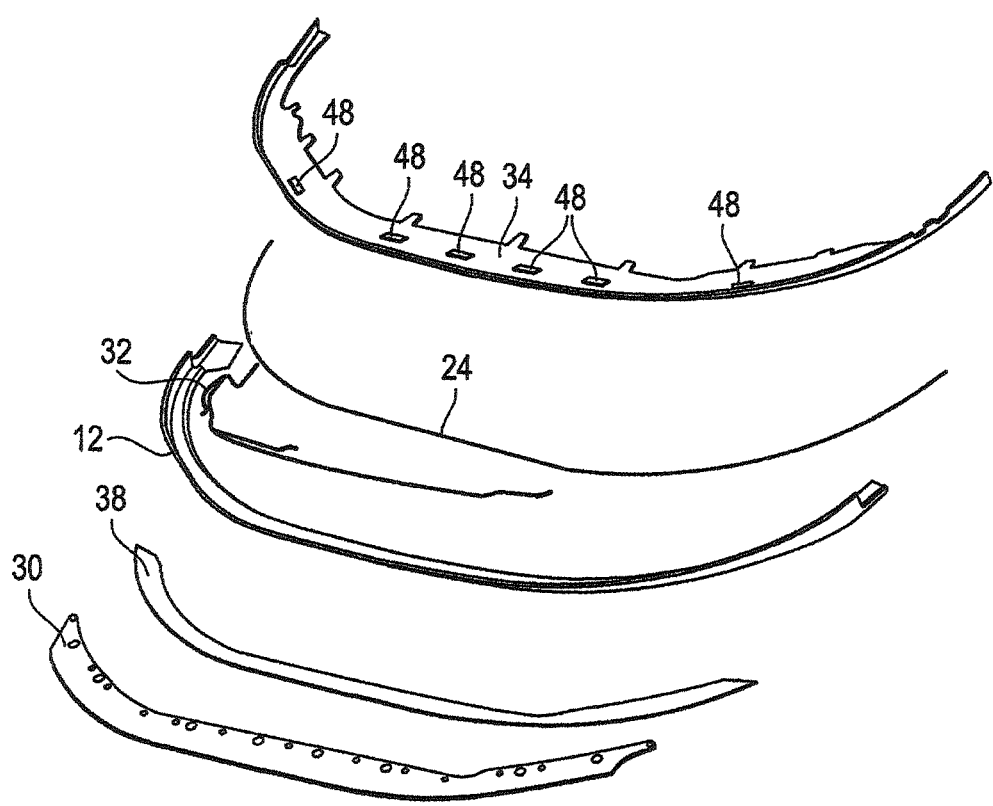
FIG. 6 is an exploded illustration of the air guiding device of FIG. 1.

As shown in FIG. 4 that the adaptor 34 has magnets 48 and the spoiler lip 12 has magnets 50 that aid in holding the spoiler lip 12 on the adaptor 34 in the retracted rest position shown. The magnets 48, 50, as seen in the transverse direction FQ of the vehicle, ensure defined bearing of the spoiler lip 12 against the adaptor device 34 over the entire extent of the air guiding device 10, in the retracted rest position.

What is claimed is:

1. An air guiding device for mounting to a lower surface of a front panel of a motor vehicle, the air guiding device comprising: an adaptor configured for mounting to the lower surface of the front panel; a fastening device connected to a rear section of adaptor; a spoiler lip extending in a transverse direction of the vehicle and an actuating device between the adaptor and the spoiler lip for moving the spoiler lip, a front part of the spoiler lip being mounted on a front section of the adaptor, and wherein the air guiding device is connectable as a module via the adaptor and the fastening device to the front panel of the motor vehicle.

2. The air guiding device of claim 1, wherein the front section of the adaptor and the front part of the spoiler lip are connected via a first clip connection.

3. The air guiding device of claim 2, wherein the front section of the adaptor is connectable to the front panel of the motor vehicle via a second clip connection.

4. The air guiding device of claim 1, wherein a rear section of the actuating device is fastened between the adaptor and the fastening device.

5. The air guiding device of claim 1, wherein the adaptor has an alignment projection and the fastening device has an alignment opening that receives the alignment projection of the adaptor to align the fastening device relative to the adaptor.

6. The air guiding device of claim 1, wherein the adaptor and the fastening device are connectable to a rear part of the front panel of the motor vehicle via a screw connection.

7. The air guiding device of claim 6, wherein the screw connection is at the rear section of the adaptor.

8. The air guiding device of claim 1, wherein the adaptor and the spoiler lip have magnets that aid in holding the spoiler lip on the adaptor in the retracted rest position.

* * * * *